United States Patent
Kwon et al.

(10) Patent No.: US 7,499,095 B2
(45) Date of Patent: Mar. 3, 2009

(54) APPARATUS AND METHOD FOR AUTO-FOCUSING IN A MOBILE TERMINAL

(75) Inventors: Seong-Geun Kwon, Daegu (KR); Chan-Ho Han, Daegu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 608 days.

(21) Appl. No.: 11/140,987

(22) Filed: Jun. 1, 2005

(65) Prior Publication Data

US 2005/0270408 A1    Dec. 8, 2005

(30) Foreign Application Priority Data

Jun. 2, 2004   (KR) ..................... 10-2004-0040141

(51) Int. Cl.
*G03B 13/00* (2006.01)
(52) U.S. Cl. .................................... 348/345
(58) Field of Classification Search ................ 348/345, 348/335, 347, 207.99, 208.99, 208.12; 359/641, 359/642, 811, 813, 814; 396/348, 349
See application file for complete search history.

(56) References Cited

U.S. PATENT DOCUMENTS 6,417,883 B1 * 7/2002 Kaneda ..................... 348/350
7,321,395 B2 * 1/2008 Gotanda ..................... 348/370

2002/0154909 A1 * 10/2002 Yamazaki et al. ........... 396/125

FOREIGN PATENT DOCUMENTS

CN    1368658    9/2002
CN    1417634    5/2003

* cited by examiner

*Primary Examiner*—David L Ometz
*Assistant Examiner*—Akshay Trehan
(74) *Attorney, Agent, or Firm*—Roylance, Abrams, Berdo & Goodman, LLP

(57) ABSTRACT

An apparatus and method for auto-focusing in a mobile terminal having a camera module which can automatically photograph an image in optimum focus when the camera function is used are provided. The apparatus and method comprise detecting the subject by performing a preview mode in a camera mode; detecting and storing a focus value while moving the lens by increasing/decreasing electrical current in stages based on a focus characteristic of the detected subject, determining based on a presently-detected focus value and a previously-stored focus value if a slope has changed, and detecting an optimum focus value from a focus value at which the slope has changed; and performing a tracking mode to track a focus in a predetermined zone which includes the detected focus value at a center of the zone. Therefore, the value of electrical current, which is applied to the camera module including the lens that moves to perform the auto-focusing for photographing an image in optimum focus, is controlled according to a distance between a subject and a lens so that the occurrence of unwanted sound caused by motion of the lens can be prevented.

18 Claims, 8 Drawing Sheets

APPARATUS AND METHOD FOR AUTO-FOCUSING IN A MOBILE TERMINAL

PRIORITY

This application claims the benefit under 35 U.S.C. 119(a) of an application entitled "Method For Auto-Focusing In Mobile Terminal" filed in the Korean Intellectual Property Office on Jun. 2, 2004 and assigned Serial No. 2004-40141, the entire contents of which are incorporated herein by reference.

BACKGROUND OF THE INVENTION

1. Field of the Invention

The present invention relates to an auto-focusing method in a mobile terminal. More particularly, the present invention relates to a method for auto-focusing in a mobile terminal comprising a camera module which can automatically photograph an image in optimum focus when the camera function is used.

2. Description of the Related Art

A camcorder, which is a representative photographing device, functions as a camera for photographing a subject and also as a video recorder.

It is necessary that the photographing device such as a camcorder performs appropriate exposure and focusing operations in order to sufficiently reproduce the image of a subject and to satisfactorily capture a momentary image. The focusing operation of the conventional photographing device such as a camera or camcorder will now be described.

A variety of focusing methods have been widely used according to systems utilized for measuring a distance between a camera and a subject. These systems are classified into an active system and a passive system. Also, the active system is further classified into an ultrasound focusing system and an infrared focusing system, and the passive system is further classified into a contrast recognition focusing system and an eye-controlled auto-focus system.

First, the active system will now be described.

The ultrasound focusing system measures a time delay from an ultrasound transmission time to its echo reception time in order to calculate a distance between a camera and a subject, and automatically adjusts a lens based on the calculated distance in order to perform a focusing operation. The infrared focusing system moves a lens to enable the infrared beam to be reflected from a subject in a scanning mode, and performs a focusing operation using a trigonometric measurement scheme.

The passive system will now be described.

According to the contrast recognition focusing system, both a mirror cooperating with a lens and a fixed lens project an equal image on a visitronic module, the images are added to focus the images on the lens, and a shutter closes. According to the eye-controlled auto-focus system, five focusing points are horizontally arranged in a finder so that a photographer can see and select one of the focusing points at which a desired target subject is focused.

When photographing a moving image, the photographer focuses using the above-mentioned auto-focusing function, and can adjust a zoom-in key and a zoom-out key to capture an image of a main subject currently in motion while constantly maintaining the size thereof, so that the photographer can photograph the main subject while maintaining the size thereof. Therefore, the photographing device such as a camera or camcorder can take a photograph in optimum focus using the auto-focusing systems when photographing a still image or a moving image.

Such a photographing device contains a system having the auto-focusing function to photograph an image through a camera module, while recording an audio signal input through a microphone.

Recently, a mobile terminal having a camera module to photograph a still image and a moving image has been developed. In addition, the mobile terminal having a camera module can record sound using a microphone thereof simultaneously while photographing an image. In such a mobile terminal, a high-performance microphone is built to receive even a very low audio signal.

However, the conventional mobile terminal supports only a normal photographing function to photograph a still image and a moving image, but does not support the auto-focusing function. Therefore, there is a need to have an auto-focusing function in the mobile terminal.

However, in the mechanical assembly of mounting a microphone and a camera module having the auto-focusing function on the conventional mobile terminal, a noise caused by the motion of a lens during the operation of the auto-focusing function may be input through the microphone.

Therefore, there is a problem in that a camera module having the auto-focusing function must be placed away a microphone as far as possible so that the input of a noise can be prevented. Also, such a limitation in a mechanical construction causes another limitation in constructing the interior circuit thereof.

SUMMARY OF THE INVENTION

Accordingly, the present invention has been made to solve the above-mentioned problems occurring in the prior art, and an object of the present invention is to provide an auto-focusing apparatus and method in a mobile terminal having a camera module by which the mobile terminal can automatically photograph an image in optimum focus when the camera function is used.

Another object of the present invention is to provide an auto-focusing apparatus and method in a mobile terminal in which an auto-focusing function module and a microphone to receive sound can be disposed in the mobile terminal without any mechanical limitation.

Still another object of the present invention is to provide an auto-focusing apparatus and method in a mobile terminal by which unwanted sound caused by motion of a lens for auto-focusing can be prevented from being input through a microphone when audio signals and an image signal are input during the photographing of a subject.

To accomplish this object, in accordance with one aspect of the present invention, there is provided an apparatus and method for auto-focusing in a mobile terminal which focuses a subject by adjusting a distance between the subject and a lens. The apparatus and method comprise detecting the subject by performing a preview mode in a camera mode; detecting and storing a focus value while moving the lens by increasing/decreasing electrical current in stages based on a focus characteristic of the detected subject, determining based on a presently-detected focus value and a previously-stored focus value if a slope has changed, and detecting an optimum focus value from a focus value at which the slope has changed; and performing a tracking mode to track a focus in a predetermined zone which comprise the detected focus value at a center of the zone.

BRIEF DESCRIPTION OF THE DRAWINGS

The above and other objects, features and advantages of the present invention will be more apparent from the following detailed description taken in conjunction with the accompanying drawings, in which.

Throughout the drawings, the same element is designated by the same reference numeral or character.

DETAILED DESCRIPTION OF AN EXEMPLARY EMBODIMENT

Hereinafter, an embodiment according to the present invention will be described with reference to the accompanying drawings.

In the following description, only a portion required to understand the operation and process according to the present invention will be described, the remaining portion will be omitted for conciseness.

In the below description, many particular items in relation to an auto-focusing method in a mobile terminal according to the present invention are shown, but these are provided as examples. In addition, it will be understood by those skilled in the art that the prevention invention can be accomplished without these specific examples without departing from the scope of the present invention.

In the following description, first to eighth stages refer to stages for controlling electrical current to move a lens according to stages in an auto-focusing procedure. According to the auto-focusing characteristic, electrical current increases/decreases depending on a detected focus value and a distance between a subject and a camera will be used as a criterion for moving the lens. In addition, in the following description, each of a first to sixth threshold values refers to values to be compared with a difference value between a presently-detected focus value and a previously-detected focus value, and has been predetermined experimentally as a negative or positive value so that an optimum focus can be detected. Also, in the following description, a long-distance mode zone refers to an interval when a distance between the lens and a subject is longest. A normal mode zone is an initial mode zone for the auto-focusing procedure, and refers to an interval when a distance between the lens and the subject is relatively shorter as compared with the long-distance mode. A short-distance mode zone refers to an interval when a distance between the lens and the subject is shortest. In addition, a tracking mode refers to a mode for rapidly tracking by using a predetermined electrical current variance a position of a focus minutely moving centering around an optimum focus value.

Figure 1:
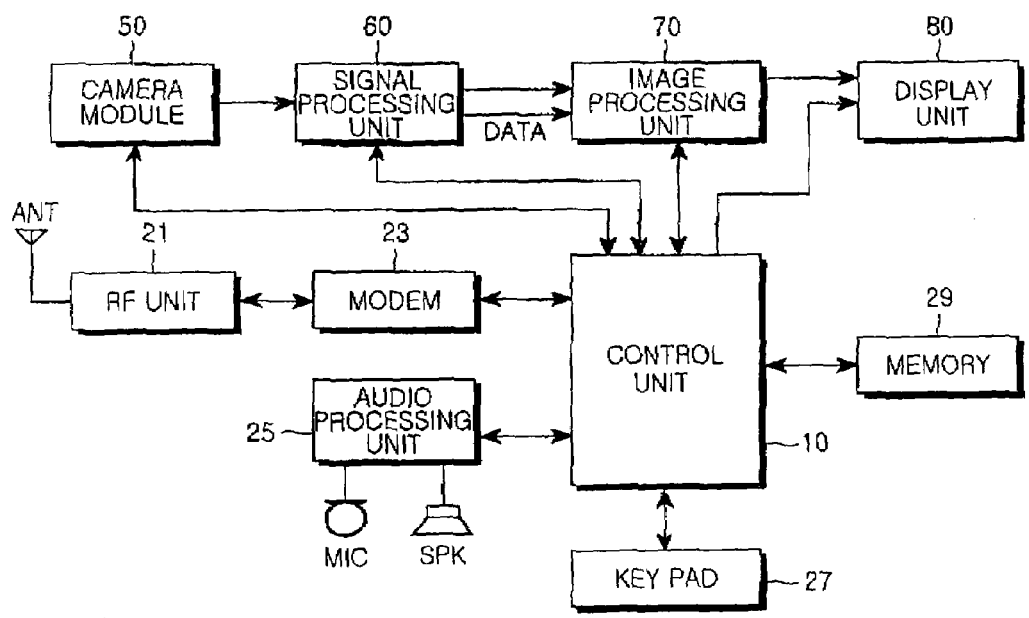
FIG. 1 is a block diagram illustrating a construction of a mobile terminal according to an embodiment of the present invention.

FIG. 1 is a block diagram illustrating a construction of a mobile terminal according to an embodiment of the present invention, in which the mobile terminal may be a mobile telephone.

A radio frequency (RF) unit 21 performs transmission and reception functions for the mobile terminal. The RF unit 21 includes a RF transmitter (not shown) and a RF receiver (not shown). The RF transmitter up-converts a frequency of a signal to be transmitted and amplifies the signal. The RF transmitter low-noise amplifies a received signal and down-converts a frequency of the received signal.

A modem 23 modulates the signal to be transmitted into an analog signal and demodulates a received analog signal to a digital signal. That is, the modem 23 encodes and modulates a signal to be transmitted, and demodulates and decodes a received signal. Herein, the modem 23 includes a CODEC (COder/DECoder), which comprises a data CODEC for processing packet data and an audio CODEC for processing audio signals such as voice.

An audio processing unit 25 reproduces a received audio signal output from the modem 23, and transfers a transmission audio signal received through a microphone (MIC) to a control unit 10. The control unit 10 transfers the transmission audio signal to the modem 23. Also, the audio processing unit 25 receives voice data from among data, which the control unit 10 has received from the modem 23, from the control unit 10, converts and outputs the received voice data into an audible sound through a speaker (SPK). The audio processing unit 25 converts a voice signal input through the microphone into data, and outputs the converted data to the modem 23. In addition, in a camera mode, the audio processing unit 25 receives an audio signal through the microphone under the control of the control unit 10. Herein, the microphone may be disposed in a camera module 50.

A key pad unit 27 includes keys for inputting numeral and character information and function keys for setting various functions. Also, the key pad unit 27 may include a camera mode key, a menu key, a confirmation key, etc.

A memory 29 may include a program memory and a data memory. The program memory stores programs for controlling the normal operation of the mobile terminal. Also, the program memory stores the entire program for sensing a subject and automatically focusing the detected subject in the camera mode. The data memory temporarily stores data generated in the course of executing the programs. Also, the data memory stores a focus value detected according to an embodiment of the present invention.

The control unit 10 controls the entire operation of the mobile terminal. The control unit 10 may include the modem 23. Also, when a camera mode is selected through the key pad unit 27 or by the menu key and confirmation key to function as a camera mode key, the control unit 10 controls the camera module 50. That is, the control unit 10 controls the entire operation of the lens to capture a subject in optimum focus while increasing/decreasing electrical current by various steps at a time according to the long-distance mode zone, the normal mode zone and the short-distance mode zone through the first to eighth stages on the basis of the auto-focusing characteristic. In addition, according to an embodiment of the present invention, after the camera module 50 has captured a subject in optimum focus in a preview mode, the control unit 10 controls the entire operation of the camera module 50 according to the tracking mode so that the camera module 50 can again capture the subject in optimum focus even when there is minute motion of the mobile terminal.

The camera module 50 obtains image data by photographing an image and comprises a camera sensor for converting an optical signal obtained by photographing into an electrical signal. Herein, it is assumed that the camera sensor is a charge-coupled device (CCD) sensor. Also, the camera module 50 includes a function block for performing the auto-focusing and the tracking mode according to a control signal of the control unit 10. Therefore, the camera module 50 can output an image signal of a subject captured with optimum focus. The interior construction of the camera module 50 will be described in detail later.

A signal processing unit 60 receives a signal of an image captured with optimum focus from the camera module 50, and converts the received image signal into digital image data. The signal processing unit 60 may include a digital signal processor (DSP).

An image processing unit 70 functions to generate screen data for displaying an image signal output from the signal processing unit 60. The image processing unit 70 transmits an image signal received under the control of the control unit 10 or image data obtained from the camera module 50 through photographing according to the size of a display unit 80, and also compresses or decompresses the image data.

The display unit 80 displays messages generated during the performance of the programs under the control of the control unit 10. The display unit 80 also displays screen data corresponding to an image signal, which have been obtained by photographing a subject in optimum focus and output from the image processing unit 70 in the camera mode. Herein, the display unit 80 may utilize a liquid crystal display (LCD). In this case, the display unit 80 may comprise a LCD controller, a memory for storing image data, a LCD display element, etc. In the case in which an LCD employing a touch screen scheme is used, the key pad unit 27 may be an input section of the LCD.

The operation of the mobile terminal will now be described with reference to FIG. 1. In the case of an outgoing mode, when a user selects an outgoing mode after performing a dialing operation using the keypad 27, the control unit 10 recognizes it, processes the dialed information received through the modem 23, converts the dial information into a RF signal through the RF unit 21, and then outputs the converted RF signal. Thereafter, when a response signal is generated from a called subscriber, the mobile station recognizes the response signal by the RF unit 21 and the modem 23. Then, a voice communication channel is formed by the audio processing unit 25, so that it becomes possible for the user to communicate with the called subscriber. Also, in the case of an incoming mode, the control unit 10 recognizes that the mobile terminal is in the incoming mode by the modem 23, and generates a ring signal by the audio processing unit 25. Thereafter, when the user selects a response to the ring signal, the control unit 10 recognizes it, and forms a voice communication channel by the audio processing unit 25, so that it becomes possible for the user to communicate with a calling subscriber. While voice communication has been described as an example in the outgoing mode and incoming mode, it will be understood that the operation may be applied to data communication for the communication of packet data and image data besides the voice communication. Also, during a waiting mode or a character communication mode, the control unit 10 displays character data processed by the modem 23 on the display unit 80.

In addition, the mobile terminal can photograph a person or the surrounding environment, and display or transmit the image obtained through the photographing with optimum focus.

The operation for the auto-focusing in the mobile terminal will now be described. Herein, the control unit 10 is a module comprising an internal-type camera disposed in the mobile terminal, and includes a charge coupled device (DDC) sensor. It should be appreciated by those skilled in the art that control unit 10 can also be an external type camera without departing from the scope of the present invention. The control unit 10 applies a control signal to the camera module 50 according to the auto-focusing function so that an image to be photographed through the camera module 50 can be captured with optimum focus. Then, the camera module 50 moves the lens without causing any noise according to the applied control signal (which has a distinct value depending on the long-distance mode, the normal mode and the short-distance mode), and photographs a subject with optimum focus through the moved or displaced lens. Thereafter, the control unit 10 controls the camera module 50 in a tracking mode so that the focus of an image for the subject, which changes depending on even minute motion of the mobile terminal, is adjusted from a detected optimum focus value initially-obtained from the auto-focusing function. Then, the signal processing unit 60 converts an image signal output from the camera module 50 into digital image data, and outputs the digital image data to the image processing unit 70. Next, the display unit 80 displays the image, which has been captured by the camera module 50, by the digital image data output from the image processing unit 70.

Figure 2:
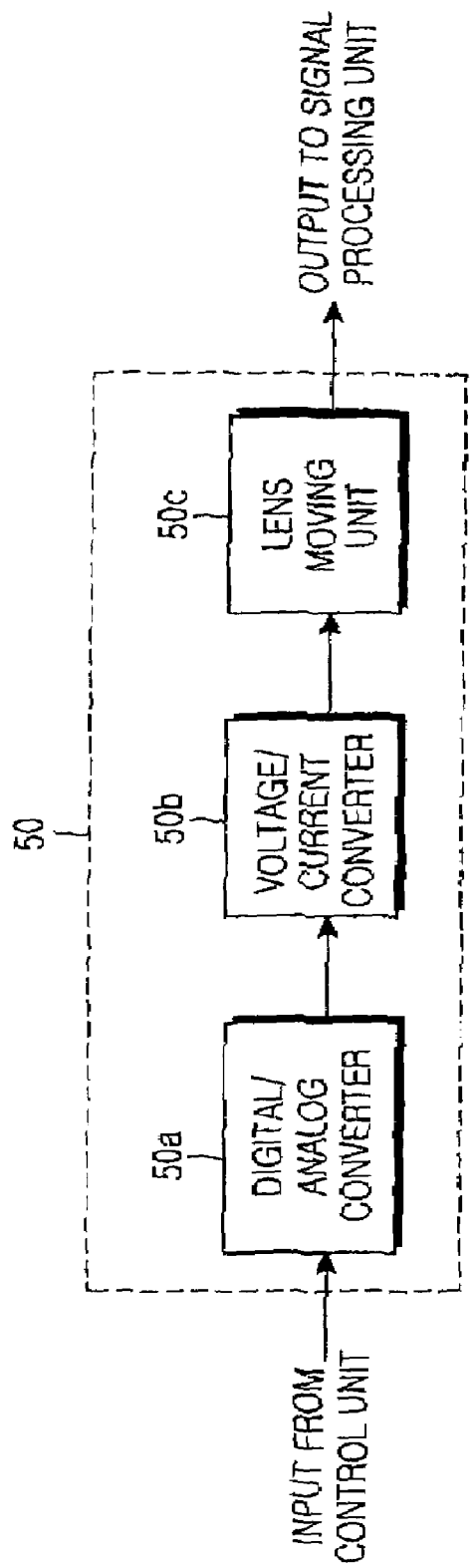
FIG. 2. is a block diagram illustrating the interior construction of the camera module shown in FIG. 1.

FIG. 2. is a block diagram illustrating the interior construction of the camera module shown in FIG. 1.

Figure 3A:
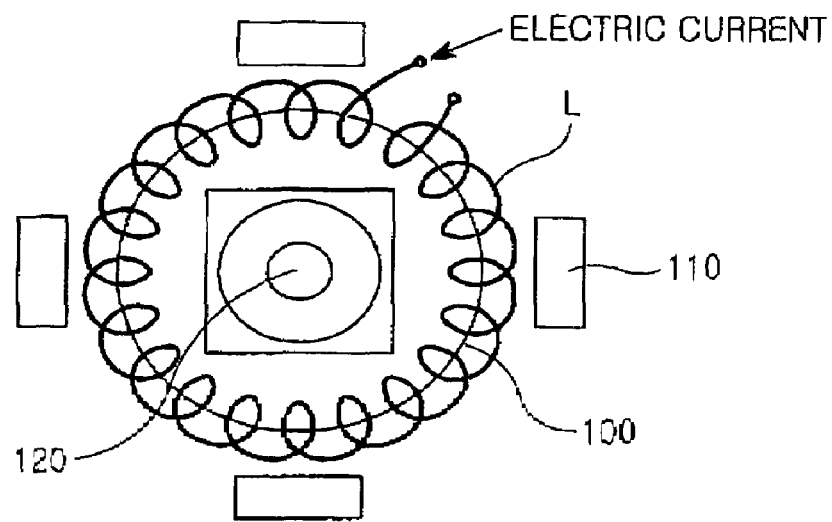
FIGS. 3A and 3B are views for explaining the operations of the camera module and a solenoid of the camera module in relation to the construction shown in FIG. 2.
Figure 3B:
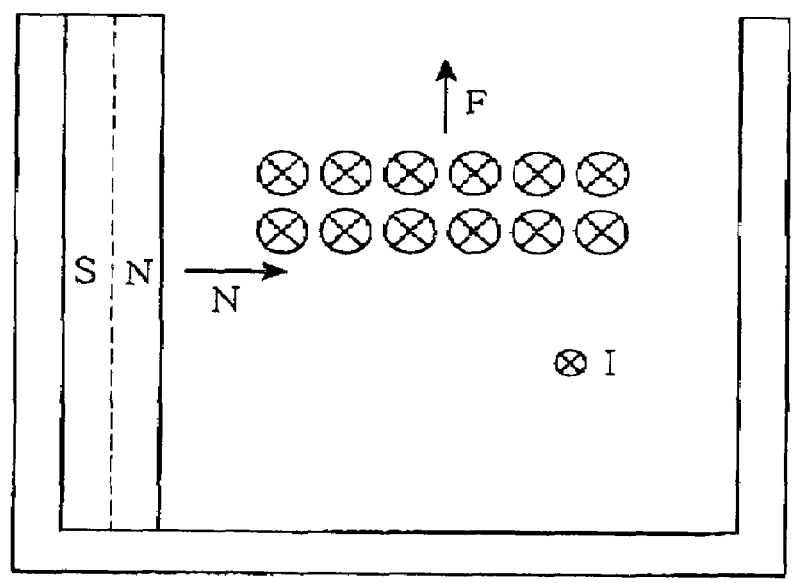

The camera module 50 comprises a digital/analog converter 50a, a voltage/current converter 50b and a lens moving unit 50c. The digital/analog converter 50a converts a digital signal into an analog signal. The voltage/current converter 50b converts an analog voltage signal received from the digital/analog converter 50a into a current signal, and outputs the current signal. The current output from the voltage/current converter 50b is applied to the lens moving unit 50c, thereby generating a magnetic field. The lens moving unit 50c moves the lens by the generated magnetic field and another magnetic field formed by an adjacent magnet. Herein, the lens moving unit 50c comprises a camera lens. Specifically, according to the lens moving unit 50c shown in FIG. 3A according to an embodiment of the present invention, an electrical current flows along a conducting wire L wound around a cylindrical form 100 by a predetermined number of turns, so that a magnetic field is generated along one direction according to an induced current by the right-hand rule. As a result, the lens 120 located over the cylindrical form 100 moves by correlation between a magnetic field generated around the conducting wire L and the intrinsic magnetic fields of magnets 110 moves. In this case, the lens 120 moves along a direction equal to that shown in FIG. 3B. The moving distance of the lens 120 is controlled by the intensity of the magnetic field formed through the solenoid. Since the intensity of the magnetic field is inversely proportional to a distance and is proportional to the intensity of the applied current, it is possible to move the lens 120 by controlling the applied current although the distance is fixed. Moving the lens by the lens moving unit 50c is achieved by conventional solenoid technology, so a detailed description thereof is omitted.

Figure 4A:
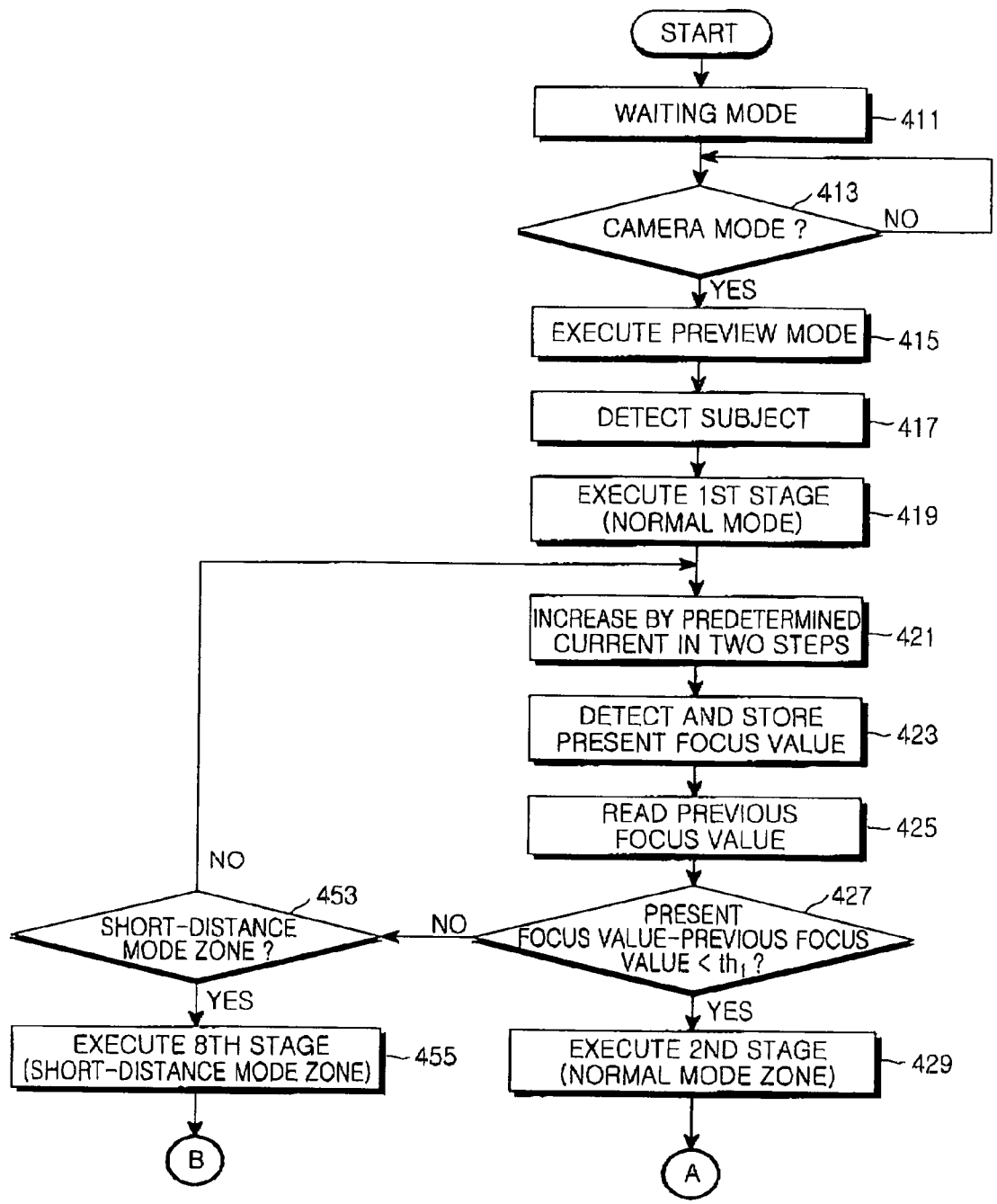
FIGS. 4A and 4B are flowcharts illustrating an auto-focusing method of the mobile terminal according to an embodiment of the present invention.
Figure 4B:
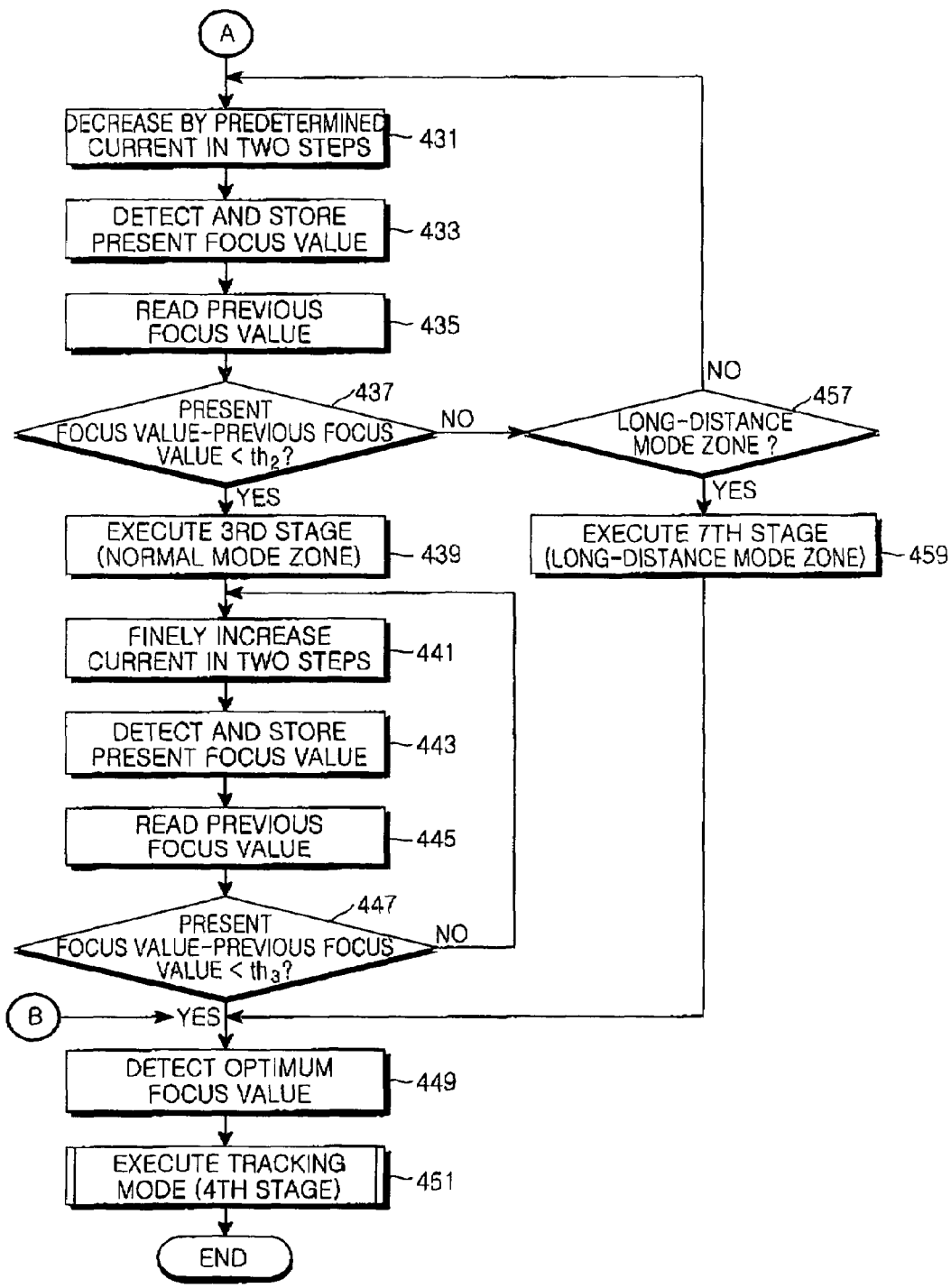

FIGS. 4A and 4B are flowcharts illustrating an auto-focusing method of the mobile terminal according to an embodiment of the present invention.

The control unit 10 is in a waiting mode at step 411, and then proceeds to step 413 in which the control unit 10 determines if the control unit 10 is in a camera mode. Herein, the camera mode may be selected by a camera mode key, or by menu and confirmation keys to perform the same function as that of the camera mode key.

As a result of the determining, when the control unit 10 is in the camera mode, the control unit 10 performs a preview mode in step 415, detects a subject in step 417, and then proceeds to step 419. Herein, steps 415 and 417 are performed at the same time. In order to perform the preview mode, the control unit 10 controls the lens 120 of the camera module 50 so that the camera module 50 can photograph a subject.

In step 419, the control unit 10 performs a normal mode in a first stage of auto-focusing in order to adjust an image of a subject photographed through the camera module 50 in optimum focus.

Figure 5:
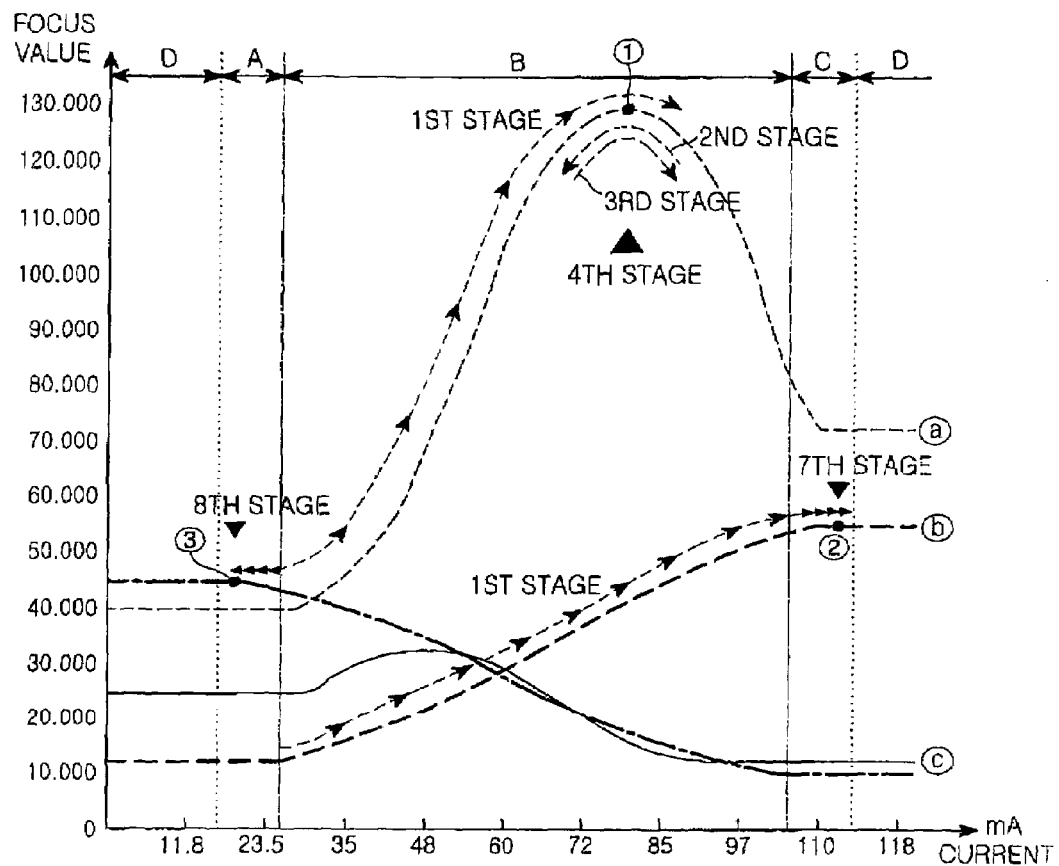
FIG. 5 shows a graph illustrating a focus characteristic according to an embodiment of the present invention.

FIG. 5 shows a graph illustrating a focus characteristic according to an embodiment of the present invention. Herein, the transverse axis represents electrical current provided to the camera module 50, and the longitudinal axis represents focus values. In addition, according to the amount of electrical current (which the camera module 50 finally provide to move the lens 120 by a control signal received from the control unit 10) and a distance between the lens 120 and a subject, the graph are divided into a long-distance mode zone A, a normal mode zone B, a short-distance mode zone C and a dead zone. In FIG. 5, waveforms ⓐ to ⓒ represent focus properties according to a distance between the lens 120 and a subject captured through the camera module 50. That is, waveform ⓐ represents the case in which the waveform has an optimum focus in the normal mode zone B, waveform ⓑ represents the case in which the waveform has an optimum focus in the short-distance mode zone C, and waveform ⓒ represents the case in which the waveform has an optimum focus in the long-distance mode zone A. Herein, waveform ⓑ has a focus characteristic in the short-distance mode zone C and represents a case in which a focus value enters the short-distance mode zone C by motion of the mobile terminal having camera module 50 or a subject. Waveform ⓒ has a focus characteristic in the long-distance mode zone A and represents a case in which a focus value enters the long-distance mode zone A by motion of the mobile terminal having camera module 50 or a subject. The above-mentioned zones will be described in detail later.

The control unit 10, which has performed the first stage of the normal mode through step 419, applies a control signal to the camera module 50 in step 421 so that the electrical current can increase by a predetermined current increment, the predetermined current increment being divided into two steps, and then proceeds to step 423. In this case, the control unit 10 increases the current value by the predetermined current increment of a larger width, the predetermined current increment being divided into two steps. Therefore, it becomes possible to detect a point at which a focus value rapidly changes.

The control unit 10 detects and stores a present focus value in step 423, and performs step 425 to read a previously-stored focus value. In the state in which a first focus value detected in step 423 has been stored, when a second focus value is newly detected and stored, the first focus value becomes the previously-stored focus value (previous focus value) for the second focus value (present focus value).

Thereafter, the control unit 10 compares a value obtained by subtracting the previous focus value from the presently-detected focus value with a first threshold value (th1) in step 427. Herein, the first threshold value (th1) has been predetermined to determine if a presently-detected focus value corresponds to an inflection point at which a slope changes. Also, the first threshold value (th1) has a predetermined negative value.

As a result of the comparison, when the value obtained by the subtraction is larger than the first threshold value (th1), the control unit 10 returns to step 421 to repeat the above-mentioned steps, or enters the short-distance mode zone to find an optimum focus value. The short-distance mode zone will be described in detail later.

In contrast, as a result of the comparison, when the value obtained by the subtraction is smaller than the first threshold value (th1), the control unit 10 proceeds to step 429 to perform the second stage.

For example, it is assumed in the following description that point ❶ is an optimum focus point in FIG. 5.

In this case, when a value, which is obtained by subtracting a previous focus value from a present focus value (which has been detected by increasing an electrical current value in two steps through the first stage), is larger than the first threshold value (th1), the control unit 10 recognizes that the present focus value is located in the left zone of point ❶ which has an unchanging slope, and again performs the first stage to consecutively increase the electrical current. In contrast, when a value obtained by subtracting a previous focus value from a present focus value is smaller than the first threshold value (th1), the control unit 10 recognizes that the present focus value is located in the right zone of point ❶ and its slope changes.

As a result, when the second stage is performed, the control unit 10 applies a control signal to the camera module 50 in step 431 so that the electrical current decreases by a predetermined current decrement, the predetermined current decrement being divided into two steps, and then proceeds to step 433. In this case, the control unit 10 decreases the electrical current by the predetermined current decrement, the predetermined current decrement having a smaller width than the current increment of the first stage and being divided into two steps. Therefore, the control unit 10 searches for an optimum focus value in the second stage, which has not been found in the first stage, while finely decreasing the current value in the backward direction.

Thereafter, the control unit 10 detects and stores a present focus value in step 433, and performs step 435 to read a previously-stored focus value. In the state in which a first focus value detected in step 433 has been stored, when a second focus value is newly detected and stored, the first focus value becomes the previously-stored focus value (previous focus value) for the second focus value (present focus value).

Thereafter, the control unit 10 compares a value obtained by subtracting the previous focus value from the presently-detected focus value with a second threshold value (th2) in step 437. Herein, the second threshold value (th2) has been predetermined to determine if a presently-detected focus value corresponds to an inflection point at which a slope changes. Also, the second threshold value (th2) has a negative value larger than the first threshold value (th1).

As a result of the comparison, when the value obtained by the subtraction is larger than the second threshold value (th2), the control unit 10 returns to step 431 to repeat the above-mentioned steps, or enters the long-distance mode zone to find an optimum focus value in step 457. The long-distance mode zone will be described in detail later.

In contrast, as a result of the comparison, when the value obtained by the subtraction is smaller than the second threshold value (th2), the control unit 10 proceeds to step 439 to perform the third stage.

That is, in the second stage, the control unit 10 searches for an optimum focus value in a way more precise than in the first stage while decreasing the current value by a current decrement of a smaller width, the current decrement being divided into two steps, in order to shift the current value backward to a left focus value from a right focus value of point ❶ which is an optimum focus point in FIG. 5. When a value, which is obtained by subtracting a previous focus value from a present focus value detected with an electrical current decreasing by a predetermined current value, is larger than the second threshold value (th2), the control unit 10 recognizes that the present focus value is located in the right zone of point ❶ having an unchanging slope, and again performs the second stage to consecutively decrease the electrical current. In contrast, when a value obtained by subtracting a previous focus value from a present focus value is smaller than the second threshold value (th2), the control unit 10 recognizes that the present focus value is located in the left zone of point ❶ and its slope changes.

As a result, the control unit 10 applies a control signal to the camera module 50 in step 441 so as to increase the electrical current by a predetermined current increment, the predetermined current increment being divided into two steps, and then proceeds to step 443. In this case, the control unit 10 increases the electrical current by the predetermined current increment, the predetermined current increment having a smaller width than that of the current decrement in the second stage and being divided into two steps. Therefore, the control unit 10 searches for an optimum focus value in the third stage, which has not been found in the second stage, while finely increasing the current value in the forward direction.

Thereafter, the control unit 10 detects and stores a present focus value in step 443, and performs step 445 to read a previously-stored focus value. In the state in which a first focus value detected in step 443 has been stored, when a second focus value is newly detected and stored, the first focus value becomes the previously-stored focus value (previous focus value) for the second focus value (present focus value).

Thereafter, the control unit 10 compares a value obtained by subtracting the previous focus value from the presently-detected focus value with a third threshold value (th3) in step 447. Herein, the third threshold value (th3) has been predetermined to determine if a presently-detected focus value corresponds to an inflection point at which a slope changes. Also, the third threshold value (th3) has a negative value larger than the second threshold value (th2).

As a result of the comparison, when the value obtained by the subtraction is larger than the third threshold value (th3), the control unit 10 returns to step 441 to repeat the above-mentioned steps.

In contrast, as a result of the comparison, when the value obtained by the subtraction is smaller than the third threshold value (th3), the control unit 10 proceeds to step 449 to detect an optimum focus value. That is, an optimum focus value is acquired from a current value corresponding to a case in which the value obtained by the subtraction is smaller than the third threshold value. Accordingly, it is possible to detect an optimum focus position, for example, point ❶ in shown in FIG. 5.

Thereafter, the control unit 10 enters the tracking mode in step 451.

Although a method for finding an optimum focus is described for the case in which the optimum focus is located in the normal mode zone B, it goes without saying that an optimum focus can be located in the long-distance mode zone A or the short-distance mode zone C according to a value resulting from the comparisons of steps 427 and 437.

That is, as a result of the comparison of step 427, when a value resulting from the subtraction is larger than the first threshold value (th1), the control unit 10 proceeds to step 453 in which the control unit 10 determines if a presently detected focus value is located in the short-distance mode zone C.

As a result of the determination, when the presently detected focus value is not located in the short-distance mode zone C, the control unit 10 returns to step 421 to repeat the first stage. That is, repeating the first stage implies that the presently detected focus value continuously draws a rising curve.

In contrast, as a result of the determination, when the presently detected focus value is located in the short-distance mode zone C, control unit 10 proceeds to step 455 to perform the eighth stage. In the eight stage, the control unit 10 applies a control signal to the camera module 50 so that the electrical current increases by a predetermined current increment by one step at a time, and proceeds to step 449 to find an optimum focus value. After finding the optimum focus value, the control unit 10 performs the tracking mode in step 451. In order to prevent the occurrence of a noise caused by motion of the lens 120 in the short-distance mode zone C, it is necessary to vary the current value by a current variance in one step. Accordingly, it is possible to detect an optimum focus value as indicated by point ❷ in waveform ⓑ of FIG. 5.

Meanwhile, as a result of the comparison of step 437, when a value resulting from the subtraction is larger than the second threshold value (th2), the control unit 10 proceeds to step 457 in which the control unit 10 determines if a presently detected focus value is located in the long-distance mode zone A.

As a result of the determination, when the presently detected focus value is not located in the long-distance mode zone A, the control unit 10 returns to step 431 to repeat the second stage. That is, repeating the second stage implies that the presently-detected focus value goes continuously backward and draws a rising curve.

In contrast, as a result of the determination, when the presently detected focus value is located in the long-distance mode zone A, control unit 10 proceeds to step 459 to perform the seventh stage. In the seventh stage, the control unit 10 applies a control signal to the camera module 50 so that the electrical current decreases by a predetermined current decremented one step at a time, and proceeds to step 449 to find an optimum focus value. After detecting the optimum focus value, the control unit 10 performs the tracking mode in step 451. In order to prevent the occurrence of a noise caused by motion of the lens 120 in the long-distance mode zone A, it is necessary to vary the current value by a current variance one step at a time. Accordingly, it is possible to detect an optimum focus value as indicated by point ❷ in waveform ⓒ of FIG. 5.

Hereinafter, the tracking mode (the fourth stage) of step 451 will be described in detail with reference to the accompanying drawings.

Figure 6A:
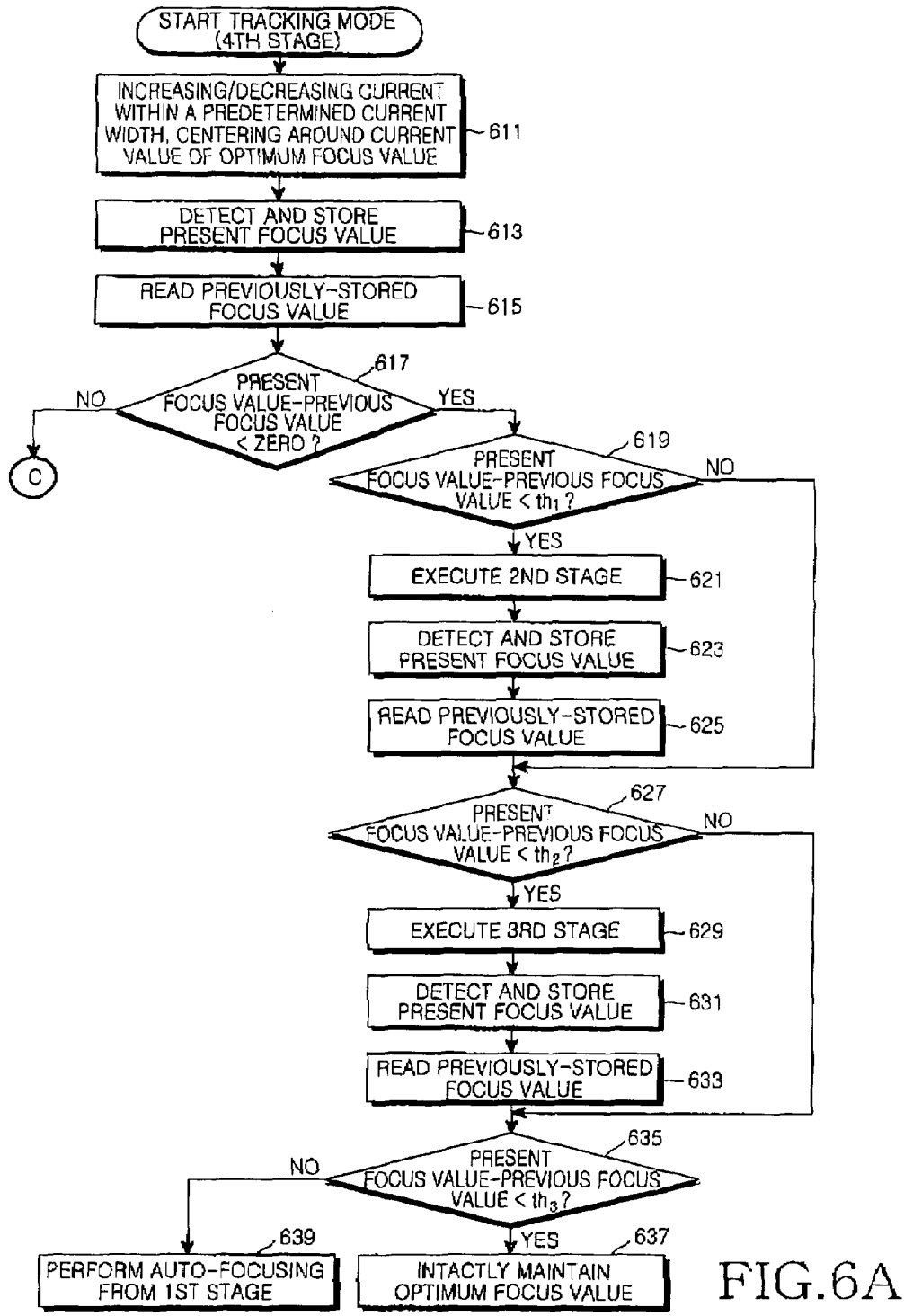
FIGS. 6A and 6B are flowcharts illustrating an auto-focusing method in the tracking mode described with reference to FIG. 5.
Figure 6B:
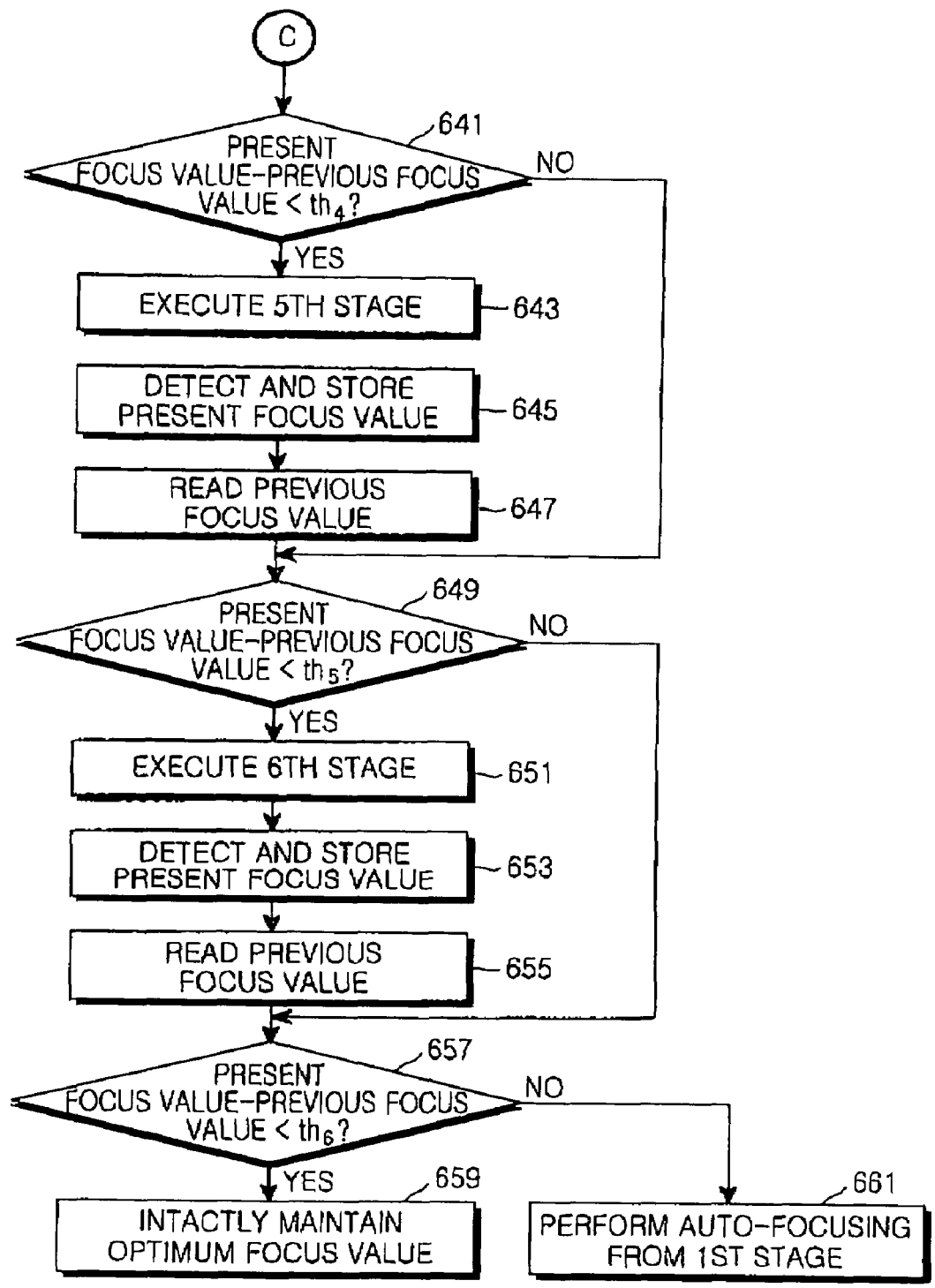

FIGS. 6A and 6B are flowcharts illustrating an auto-focusing method in the tracking mode described with reference to FIG. 5 according to an embodiment of the present invention.

In step 611, the control unit 10 applies a control signal for increasing/decreasing the electrical current within a predetermined current width to the camera module 50 and then proceeds to step 613. Herein, a current value corresponding to an optimum focus value is located in the center of the predetermined current width.

The control unit 10 detects and stores a present focus value in step 613, and then proceeds to step 615 to read a previously-stored focus value. In the state in which a first focus value detected in step 613 has been stored, when a second focus value is newly detected and stored, the first focus value becomes the previously-stored focus value (previous focus value) for the second focus value (present focus value).

Thereafter, the control unit 10 subtracts the previous focus value from the present focus value and determines if a value resulting from the subtraction is a negative value in step 617. Herein, according to a result of the determination of step 617, a progress direction for finding an optimum focus value (i.e., a value and a direction of electrical current applied to the camera module 50) is determined. According to the determined progress direction, either the second and third stages or the fifth and sixth stage are performed.

As a result of the determination of step 617, when the value resulting from the subtraction is a negative value, the control unit 10 compares the value resulting from the subtraction with the first threshold value (th1) in step 619.

As a result of the comparison, when the value resulting from the subtraction is smaller than the first threshold value (th1), the control unit 10 proceeds to step 621 to perform the second stage, thereby providing electrical current having a current value of the second stage to the camera module 50. The control unit 10 detects and stores a present focus value in step 623, proceeds to step 625 to read a previously-stored focus value, and then proceeds to step 627.

In contrast, as a result of the comparison, when the value resulting from the subtraction is larger than the first threshold value (th1), the control unit 10 does not proceed to steps 621 to 625 but proceeds to step 627. In step 627, the control unit 10 compares the value resulting from the subtraction with the second threshold value (th2).

As a result of the comparison, when the value resulting from the subtraction is smaller than the second threshold value (th2), the control unit 10 proceeds to step 629 to perform the third stage. In the third stage, the control unit 10 provides electrical current having a current value of the third stage to the camera module 50. The control unit 10 detects and stores a present focus value in step 631, proceeds to step 633 to read a previously-stored focus value, and then proceeds to step 635.

In contrast, as a result of the comparison, when the value resulting from the subtraction is larger than the second threshold value (th2), the control unit 10 does not proceed to steps 629 to 633 but proceeds to step 635. In step 635, the control unit 10 compares the value resulting from the subtraction with the third threshold value (th3).

As a result of the comparison, when the value resulting from the subtraction is smaller than the third threshold value (th3), the control unit 10 intactly maintains a focus value, which has been detected before the tracking mode is performed, as an optimum focus value in step 637.

In contrast, when the value resulting from the subtraction is larger than the third threshold value (th3), the control unit 10 performs the auto-focusing from the first stage in step 639. Repeating the auto-focusing is performed to find an optimum focus value. This occurs when either the mobile terminal or a subject captured in the preview mode moves by a large amount.

For example, this corresponds to the case in which a focus moves in the direction toward the short-distance mode zone after point ❶ is found as an optimum focus point.

Meanwhile, as a result of the determination of step 617, when the value resulting from the subtraction is a positive value, the control unit 10 compares the value resulting from the subtraction with the fourth threshold value (th4) in step 641.

As a result of the comparison, when the value resulting from the subtraction is smaller than the fourth threshold value (th4), the control unit 10 proceeds to step 643 to perform the fifth stage, thereby providing electrical current having a current value of the fifth stage to the camera module 50. In the fifth stage, the control unit 10 progresses the steps for focusing in a direction opposite to that in the second stage, and controls the electrical current by two steps at a time to find the optimum focus in a way more precise than in the first stage. The control unit 10 detects and stores a present focus value in step 645, proceeds to step 647 to read a previously-stored focus value, and then proceeds to step 649.

In contrast, as a result of the comparison of step 641, when the value resulting from the subtraction is larger than the fourth threshold value (th4), the control unit 10 does not proceed to steps 643 to 647 but proceeds to step 649. In step 649, the control unit 10 compares the value resulting from the subtraction with the fifth threshold value (th5).

As a result of the comparison of step 649, when the value resulting from the subtraction is larger than the fifth threshold value (th5), the control unit 10 proceeds to step 651 to perform the sixth stage. In the sixth stage, the control unit 10 provides electrical current having a current value of the sixth stage to the camera module 50. In the sixth stage, the control unit 10 progresses the steps for finding a focus in a direction opposite to that in the third stage, and controls the electrical current by two steps at a time to find an optimum focus in a way more precise than that in the fifth stage. The control unit 10 detects and stores a present focus value in step 653, proceeds to step 655 to read a previously-stored focus value, and then proceeds to step 657.

In contrast, as a result of the comparison of step 649, when the value resulting from the subtraction is smaller than the fifth threshold value (th5), the control unit 10 does not proceed to steps 651 to 655 but proceeds to step 657. In step 657, the control unit 10 compares the value resulting from the subtraction with the sixth threshold value (th6).

As a result of the comparison, when the value resulting from the subtraction is larger than the sixth threshold value (th6), the control unit 10 intactly maintains a focus value, which has been detected before the tracking mode is performed, as an optimum focus value in step 659.

In contrast, when the value resulting from the subtraction is smaller than the sixth threshold value (th6), the control unit 10 performs the auto-focusing from the first stage. Repeating the auto-focusing is performed to find an optimum focus value. This occurs either when the mobile terminal moves by a significant amount or when a subject captured in the preview mode moves by a large amount.

For example, this corresponds to the case in which a focus moves in the direction toward the long-distance mode zone A after point ❶ is found as an optimum focus.

According to the auto-focusing method of the mobile terminal of the present invention, electrical current having intrinsic values depending on each mode zone and depending on threshold values predetermined by experiment is provided to move the lens in order to capture an image in optimum focus, so that it is possible to prevent the occurrence of a noise caused by motion of the lens.

As described above, according to the embodiment of the present invention, the value of electrical current, which is applied to the camera module comprising the lens that moves to perform the auto-focusing for photographing an image in optimum focus, is controlled according to a distance between a subject and the lens 120 so that the occurrence of unwanted sound caused by motion of the lens can be prevented. Therefore, the user can obtain an image without unwanted sound caused by motion of the lens in photographing with audio. In addition, since the occurrence of a noise caused by motion of the lens is prevented, it is possible to overcome the mechanical limitation that the microphone receiving sound and the lens must be spaced from each other to prevent a noise caused by motion of the lens from being input. Also, since the mechanical limitation is overcome, it is possible to mass-produce various mobile terminals having a camera module.

While the present invention has been shown and described with reference to certain embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for auto-focusing in a mobile terminal which focuses a subject by adjusting a distance between the subject and a lens, the method comprising the steps of:
   detecting the subject by performing a preview mode in a camera mode;
   detecting and storing a focus value while moving the lens according to a distance between the detected subject and the lens, determining based on a presently-detected focus value and a previously-stored focus value if a slope has changed, and detecting an optimum focus value from a focus value at which the slope has changed;
   performing a tracking mode to track a focus in a predetermined zone which comprises the detected optimum focus value;
   comparing a first resultant value obtained by subtracting a first previous focus value from a first presently-detected focus value with a first threshold value, the first presently-detected focus value being detected by increasing electrical current by a first predetermined number of steps from a normal mode zone, the normal mode zone initially starting in a first stage carried-out when an auto-focusing is performed;
   carrying out a second stage in the normal mode zone when the first resultant value is smaller than the first threshold value, detecting a second presently-detected focus value by decreasing the electrical current by the first predetermined number of steps, and comparing a second resultant value obtained by subtracting a second previous focus value from the second presently-detected focus value with a second threshold value;
   carrying out a third stage when the second resultant value is smaller than the second threshold value, detecting a third presently-detected focus value by finely increasing the electrical current by the first predetermined number of steps, and comparing a third resultant value obtained by subtracting a third previous focus value from the third presently-detected focus value with a third threshold value; and
   detecting an optimum focus value when the third resultant value is smaller than the third threshold value.

2. The method as claimed in claim 1, further comprising the steps of:
   determining if the first presently-detected focus value is located in a short-distance mode zone when the first resultant value obtained by subtracting the first previous focus value from the first presently-detected focus value is larger than the first threshold value;
   increasing the electrical current by a second predetermined number of steps to detect an optimum focus value by carrying out an eighth stage when the first presently-detected focus value is located in the short-distance mode zone; and
   performing the first stage when the first presently-detected focus value is located out of the short-distance mode zone.

3. The method as claimed in claim 2, wherein the short-distance mode corresponds to a state in which a distance between the lens and the subject is shortest.

4. The method as claimed in claim 1, further comprising the steps of:
   determining if the second presently-detected focus value is located in a long-distance mode zone when the second resultant value obtained by subtracting the second previous focus value from the second presently-detected focus value is larger than the second threshold value;
   increasing the electrical current by the second predetermined number of steps to detect an optimum focus value by carrying out a seventh stage when the second presently-detected focus value is located in the long-distance mode zone; and
   performing the second stage when the second presently-detected focus value is located out of the long-distance mode zone.

5. The method as claimed in claim 4, wherein the second predetermined number of steps for increasing the electrical current is one step.

6. The method as claimed in claim 4, wherein the long-distance mode corresponds to a state in which a distance between the lens and the subject is longest.

7. The method as claimed in claim 1, wherein the first to third threshold values are determined as optimum values by experiments, respectively.

8. The method as claimed in claim 1, wherein the first to third threshold values are negative values, in which the first threshold value is a smallest value and the third threshold value is a largest value.

9. The method as claimed in claim 1, wherein the first predetermined number of steps for increasing the electrical current is two steps.

10. The method as claimed in claim 1, further comprising the steps of:
    comparing a fourth resultant value obtained by subtracting a fourth previous focus value from a fourth present focus value with the first threshold value when the fourth resultant value is a negative value in the tracking mode;
    comparing a fifth resultant value obtained by subtracting a fifth previous focus value from a fifth present focus value with the second threshold value by carrying out the second stage when the fourth resultant value is smaller than the first threshold value;
    comparing a sixth resultant value obtained by subtracting a sixth previous focus value from a sixth present focus value with the third threshold value by carrying out the third stage when the fifth resultant value is smaller than the second threshold value; and
    selectively maintaining the optimum focus value when the sixth resultant value is smaller than the third threshold value, and performing the auto-focusing from the first stage of the normal mode when the sixth resultant value is larger than the third threshold value.

11. The method as claimed in claim 10, further comprising the steps of:
    comparing a seventh resultant value obtained by subtracting a seventh previous focus value from a seventh present focus value with the fourth threshold value when the seventh resultant value is a positive value in the tracking mode;
    comparing an eighth resultant value obtained by subtracting an eighth previous focus value from an eighth present focus value with the fifth threshold value by carrying out the fifth stage when the seventh resultant value is smaller than the fourth threshold value;

comparing a ninth resultant value obtained by subtracting a ninth previous focus value from a ninth present focus value with the sixth threshold value by carrying out the sixth stage when the eighth resultant value is smaller than the fifth threshold value; and selectively maintaining the optimum focus value when the ninth resultant value is smaller than the sixth threshold value, and again performing the auto-focusing from the first stage of the normal mode when the ninth resultant value is larger than the sixth threshold value.

12. The method as claimed in claim 11, wherein the fourth to sixth threshold values are determined as optimum values by experiments, respectively.

13. The method as claimed in claim 12, wherein the fourth to sixth threshold values are positive values, in which the fourth threshold value is a smallest value and the sixth threshold value is a largest value.

14. The method as claimed in claim 1, wherein the normal mode refers to a mode in which performance for auto-focusing starts.

15. The method as claimed in claim 1, the tracking mode refers to a mode for rapidly tracking by using a predetermined electrical current variance a position of a focus minutely moving centering around an optimum focus value.

16. An apparatus for performing an auto-focus in a mobile terminal, comprising:
  a lens for focusing a camera;
  an input unit for entering commands to change modes of the mobile terminal;
  a memory for storing a focus value;
  and a controller for detecting the subject by performing a preview mode when the mobile terminal is in a camera mode, detecting and storing a focus value while moving the lens according to a distance between the detected subject, determining based on a presently-detected focus value and a previously-stored focus value if a slope has changed, detecting an optimum focus value from a focus value at which the slope has changed, and performing a tracking mode to track a focus in a predetermined zone which comprises the detected optimum focus value;
  wherein the controller further compares a first resultant value obtained by subtracting a first previous focus value from a first presently-detected focus value with a first threshold value, the first presently-detected focus value being detected by increasing electrical current by a first predetermined number of steps from a normal mode zone, the normal mode zone initially starting in a first stage carried-out when an auto-focusing is performed, carry out a second stage in the normal mode zone when the first resultant value is smaller than the first threshold value, detect a second presently-detected focus value by decreasing the electrical current by the first predetermined number of steps, compares a second resultant value obtained by subtracting a second previous focus value from the second presently-detected focus value with a second threshold value, carry out a third stage when the second resultant value is smaller than the second threshold value, detects a third presently-detected focus value by finely increasing the electrical current by the first predetermined number of steps, compare a third resultant value obtained by subtracting a third previous focus value from the third presently-detected focus value with a third threshold value, and detects an optimum focus value when the third resultant value is smaller than the third threshold value.

17. The apparatus of claim 16, wherein the controller further determines if the first presently-detected focus value is located in a short-distance mode zone when the first resultant value obtained by subtracting the first previous focus value from the first presently-detected focus value is larger than the first threshold value, increases the electrical current by a second predetermined number of steps to detect an optimum focus value by carrying out an eighth stage when the first presently-detected focus value is located in the short-distance mode zone, and performs the first stage when the first presently-detected focus value is located out of the short-distance mode zone.

18. The apparatus of claim 17, wherein the short-distance mode corresponds to a state in which a distance between the lens and the subject is shortest.

* * * * *